(12) United States Patent
Tsusaka et al.

(10) Patent No.: US 11,422,562 B2
(45) Date of Patent: Aug. 23, 2022

(54) PATH GENERATION DEVICE

(71) Applicant: KABUSHIKI KAISHA TOYOTA JIDOSHOKKI, Kariya (JP)

(72) Inventors: Yuuji Tsusaka, Nagakute (JP); Akinobu Fujii, Nagakute (JP); Minoru Tanaka, Nagakute (JP); Shingo Hattori, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/981,918

(22) PCT Filed: Feb. 21, 2019

(86) PCT No.: PCT/JP2019/006620
§ 371 (c)(1),
(2) Date: Sep. 17, 2020

(87) PCT Pub. No.: WO2019/181351
PCT Pub. Date: Sep. 26, 2019

(65) Prior Publication Data
US 2021/0109529 A1     Apr. 15, 2021

(30) Foreign Application Priority Data

Mar. 19, 2018  (JP) .............................. JP2018-050799

(51) Int. Cl.
*G05D 1/02* (2020.01)
*B62D 15/02* (2006.01)
(52) U.S. Cl.
CPC ......... *G05D 1/0212* (2013.01); *B62D 15/021* (2013.01)

(58) Field of Classification Search
CPC ........................... G05D 1/0212; B62D 15/021
(Continued)

(56) References Cited

U.S. PATENT DOCUMENTS 10,118,696 B1 * 11/2018 Hoffberg ............... B64C 39/001
2006/0269387 A1 * 11/2006 Yamaguchi ............ B62D 57/00
                                                                 414/729
(Continued)

FOREIGN PATENT DOCUMENTS

JP          03-252707 A       11/1991

OTHER PUBLICATIONS

International Search Report for PCT/JP2019/006620, dated Apr. 23, 2019.

*Primary Examiner* — Yazan A Soofi
(74) *Attorney, Agent, or Firm* — Sughrue Mion, PLLC

(57) ABSTRACT

A path generation device is configured to generate a path along which a mobile object is to travel. The device comprises a planner module configured to plan a steering angle and a steering angular velocity for the mobile object to travel from a start position to a goal position by generating first and second isosceles triangles connecting the start position and the goal position based on the start position of the mobile object, a start position traveling direction being a traveling direction of the mobile object at the start position, the goal position of the mobile object, and a goal position traveling direction being a traveling direction of the mobile object at the goal position. The device comprises a curved path applying module configured to apply a first curved path along legs of the first isosceles triangle and apply a second curved path along legs of the second isosceles triangle.

15 Claims, 12 Drawing Sheets

(58) Field of Classification Search
USPC .......................................................... 701/25
See application file for complete search history.

(56) References Cited

U.S. PATENT DOCUMENTS

| | | | | |
|---|---|---|---|---|
| 2010/0076640 | A1* | 3/2010 | Maekawa | G05D 1/0217 |
| | | | | 701/26 |
| 2018/0011489 | A1* | 1/2018 | Oba | B62D 15/025 |
| 2018/0284769 | A1* | 10/2018 | Wang | G05D 1/0088 |
| 2021/0311205 | A1* | 10/2021 | Davidson | G01S 19/43 |

* cited by examiner

PATH GENERATION DEVICE

TECHNICAL FIELD

This application is a National Stage of International Application No. PCT/JP2019/006620 filed Feb. 21, 2019, claiming priority based on Japanese Patent Application No. 2018-050799 filed on Mar. 19, 2018, the contents of which are hereby incorporated by reference into the present application. The description herein discloses an art related to a path generation device.

BACKGROUND ART

Techniques that allow a mobile object such as an unmanned forklift to travel autonomously are in development. In order for the mobile object to travel autonomously, a path needs to be generated. For example, JP H3-252707 A describes a technique for generating path data.

SUMMARY OF INVENTION

Technical Problem

When a mobile object is to travel autonomously, path data needs to be generated at a certain control cycle (such as every 10 milliseconds) and its traveling state needs to be adjusted finely. Here, for example, if a clothoid curve is to be used for generation of the path data, numerical integration is required since coordinates of clothoid points cannot be expressed by an elementary function. In this case, there may be cases in which the generation of the path data within the control cycle is difficult. The description herein discloses a path generation device configured to easily generate path data.

Solution to Technical Problem

The present description discloses a path generation device configured to generate a path along which a mobile object is to travel. The device comprises a planner module configured to plan a steering angle and a steering angular velocity for the mobile object to travel from a start position to a goal position by generating a first isosceles triangle and a second isosceles triangle connecting the start position and the goal position based on the start position of the mobile object, a start position traveling direction being a traveling direction of the mobile object at the start position, the goal position of the mobile object, and a goal position traveling direction being a traveling direction of the mobile object at the goal position. The device comprises a curved path applying module configured to apply a first curved path along legs of the first isosceles triangle and apply a second curved path along legs of the second isosceles triangle. The planner module is configured to equalize lengths of the legs of the first isosceles triangle and lengths of the legs of the second isosceles triangle. The planner module is configured to arrange a first vertex of the first isosceles triangle on a base side thereof at the start position. The planner module is configured to arrange a first vertex of the second isosceles triangle on a base side thereof at the goal position. The planner module is configured to connect a second vertex of the first isosceles triangle on the base side thereof with a second vertex of the second isosceles triangle on the base side thereof.

The steering angle and the steering angular velocity can be planned by using the first and second isosceles triangles connecting the start position and the goal position. Further, the first and second curved paths can be generated by applying the curved path along the legs of the first and second isosceles triangles. In generating a curved path, there is no need to use complicated calculations such as numerical integration. The curved path can be generated within the control cycle.

The planner module may be configured to calculate the lengths of the legs under a condition that the legs of the first and second isosceles triangles are in a straight line at a connecting point between the first isosceles triangle and the second isosceles triangle. The planner module may be configured to set a third vertex interposed between the legs of the first isosceles triangle at a position on a first extended line passing through the start position and extending in the start position traveling direction. The position may be at a distance equal to the length of the legs from the start position. The planner module may be configured to set a third vertex interposed between the legs of the second isosceles triangle at a position on a second extended line passing through the goal position and extending in the goal position traveling direction. The position may be at a distance equal to the length of the legs from the goal position. The planner module may be configured to set a midpoint between the third vertex of the first isosceles triangle and the third vertex of the second isosceles triangle as the second vertex of the first isosceles triangle and the second vertex of the second isosceles triangle. The details of the advantageous effects will be described in the embodiments.

The planner module may be configured to determine positivity/negativity of a first angle which is an angle formed by the leg of the first isosceles triangle extending from the start position with respect to a base of the first isosceles triangle. The planner module may be configured to determine positivity/negativity of a second angle which is an angle formed by the leg of the second isosceles triangle extending from the second vertex with respect to a base of the second isosceles triangle. In a case where the first and second angles are both positive or both negative, the planner module may be configured to set an intersection of the first extended line and a third extended line which connects the goal position and the third vertex of the second isosceles triangle. In a case where a first distance between the intersection and the start position is smaller than a second distance between the intersection and the goal position, the planner module may be configured to re-set a position on the third extended line, the position being at the first distance from the intersection toward the goal position, as the second vertices of the first and second isosceles triangles. In a case where the first distance is greater than the second distance, the planner module may be configured to re-set a position on the first extended line, the position being at the second distance from the intersection toward the start position, as the second vertices of the first and second isosceles triangles. The details of the advantageous effects will be described in the embodiments.

The curved path applying module may be configured to set a value of a specific parameter by differentiating a parametric equation representing the curved path using a parameter, such that an inclination of the curved path at an intersection between a perpendicular bisector of a base of the first isosceles triangle and the curved path becomes equal to an inclination of the base of the first isosceles triangle. The curved path applying module may be configured to generate a curved path with a normalized size by combining paths obtained by the specific parameter with the perpendicular bisector of the base of the first isosceles triangle in line symmetry. The curved path applying module may be configured to apply the first curved path to the legs of the first isosceles triangle by enlarging or contracting the curved path with the normalized size such that respective ends of the curved path with the normalized size match the first and second vertices of the first isosceles triangle on the base side thereof. The details of the advantageous effects will be described in the embodiments.

The parametric equation may be a quintic equation of the parameter. An equation that differentiated the parametric equation by reducing the power by one may include the parameter only in a quadratic or biquadratic form.

DESCRIPTION OF EMBODIMENTS (Configuration of Forklift 10)

Figure 1:
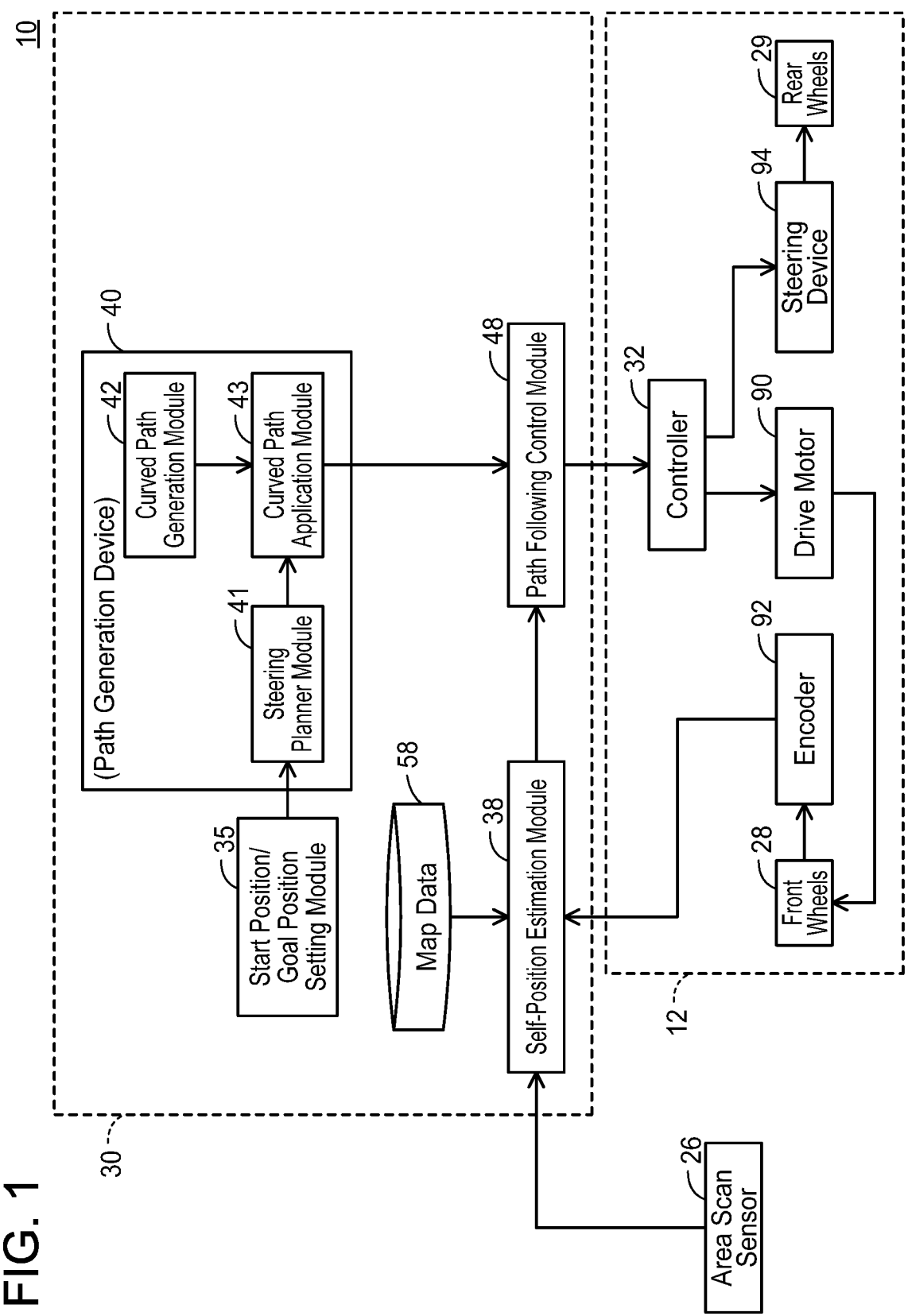
FIG. 1 is a block diagram showing a configuration of a forklift of an embodiment.

Hereinbelow, a forklift 10 of an embodiment will be described with reference to the drawings. The forklift 10 shown in FIG. 1 is an unmanned forklift. The forklift 10 is provided with a vehicle body 12, an area scan sensor 26, and an arithmetic unit 30.

The vehicle body 12 is provided with front wheels 28 and rear wheels 29. An encoder 92 is connected to the left and right front wheels 28, and is configured to detect rotation of the front wheels 28. The encoder 92 is configured to detect a traveling amount and a traveling direction of the vehicle body 12 based on operations of the left and right front wheels 28. A drive wheel motor 90 is connected to the front wheels 28 via a drive mechanism that is not shown, and the front wheels 28 are driven to rotate by the drive wheel motor 90.

The area scan sensor 26 is provided on the vehicle body 12, and is an area scan sensor of a one-dimensional scan type configured to scan laser beam in one direction (being a horizontal direction in the present embodiment). The area scan sensor 26 is configured to measure distances between the vehicle body 12 and objects within a set space that is set in front of the vehicle body 12. According to this, it obtains distance data in front of the forklift 10. The distance data obtained by the area scan sensor 26 is inputted to a self-position estimation module 38 of the arithmetic unit 30.

A controller 32 is constituted of a microprocessor having a CPU and the like. The controller 32 is installed in the vehicle body 12. As shown in FIG. 1, the controller 32 is communicably connected to the drive wheel motor 90, a steering device 94, and the like, and is configured to control their operations. That is, the controller 32 is configured to control the traveling direction and traveling velocity of the forklift 10 by driving the drive wheel motor 90 and the steering device 94.

The arithmetic unit 30 is constituted of a microprocessor having a CPU and the like. The arithmetic unit 30 is provided with a start position/goal position setting module 35, a path generation device 40, map data 58, the self-position estimation module 38, and a path following control module 48. The map data 58 is data indicating positions and sizes of objects (such as posts and walls) that are present in a space in which the forklift 10 is to travel. For example, the objects in the area in which the forklift 10 is to travel may be measured in advance by the area scan sensor 26, and the map data 58 may be generated based on a measurement result thereof.

The map data 58, the distance data of surrounding objects measured by the area scan sensor 26, and the traveling amount and the traveling direction of the vehicle body 12 detected by the encoder 92 are inputted to the self-position estimation module 38. The self-position estimation module 38 is configured to estimate a position of the forklift 10 based on the input data as aforementioned. The start position/goal position setting module 35 is configured to set a start position and a goal position of the forklift 10.

The path generation device 40 is provided with a steering planner module 41, a curved path generation module 42, and a curved path application module 43. The steering planner module 41 is configured to plan a steering direction for the forklift 10 to move from the start position to the goal position by generating a first isosceles triangle and a second isosceles triangle that connect the start position and the goal position. The curved path generation module 42 is configured to generate a curved path with a normalized size. The curved path application module 43 is configured to generate curved path data by applying a curved path to the first and second isosceles triangles. According to this, the steering angle and the steering angular velocity are obtained.

The path following control module 48 is configured to calculate a control instruction value for moving the vehicle body 12 to the goal position based on the curved path data generated in the curved path application module 43 and a current position of the forklift 10 (being its own position calculated by odometry). The generated control instruction value is inputted to the controller 32, and the controller 32 causes the vehicle body 12 to travel toward the goal position.

(Prerequisite Features)

Figure 2:
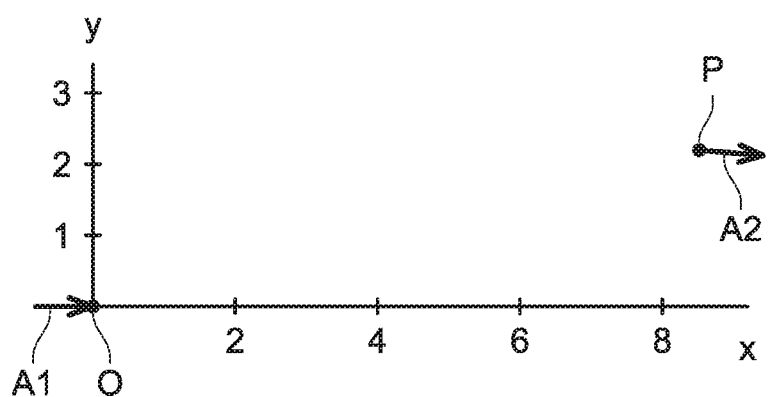
FIG. 2 is a diagram showing a start position and a goal position.

Prerequisite features on how the description herein is described will be explained. A position and an orientation of the forklift 10 may collectively be termed a "pose". A center point of a vehicle (which may also be termed a representative point or an origin) is a center of left and right wheels that are not steered. In case of the forklift 10 of the present embodiment, this corresponds to a center of the front wheels 28 in a left and right direction. This center point is assumed as that tire slippage is ignorable small. Due to this, the center point shifts only frontward and rearward without shifting leftward and rightward, thus is optimal as the representative point. In order to maintain generality, the start position O will be an origin of a ground surface coordinate system as shown in FIG. 2. Further, a direction of a start orientation A1 being an orientation of the forklift 10 at the start position will be a x-axis direction in the ground surface coordinate system. The start orientation A1 is the traveling direction of the forklift 10 at the start position O. In the present embodiment, generation of a path from a start position posture (pose) to an arbitrary goal position P with an arbitrary goal orientation A2 will be considered. Here, the goal orientation A2 is the traveling direction of the forklift 10 at a time point of having reached the goal position P. Further, in the present embodiment, only a case in which a x coordinate of the goal position P is positive (x>0) will be considered. There are cases in which a completely identical program can generate a suitable path even if x>0 does not stand true at the goal position, however, when x<0 stands true, such a case is most likely a case of traveling in reverse.

(Method of Generating First Curved Path)

Figure 3:
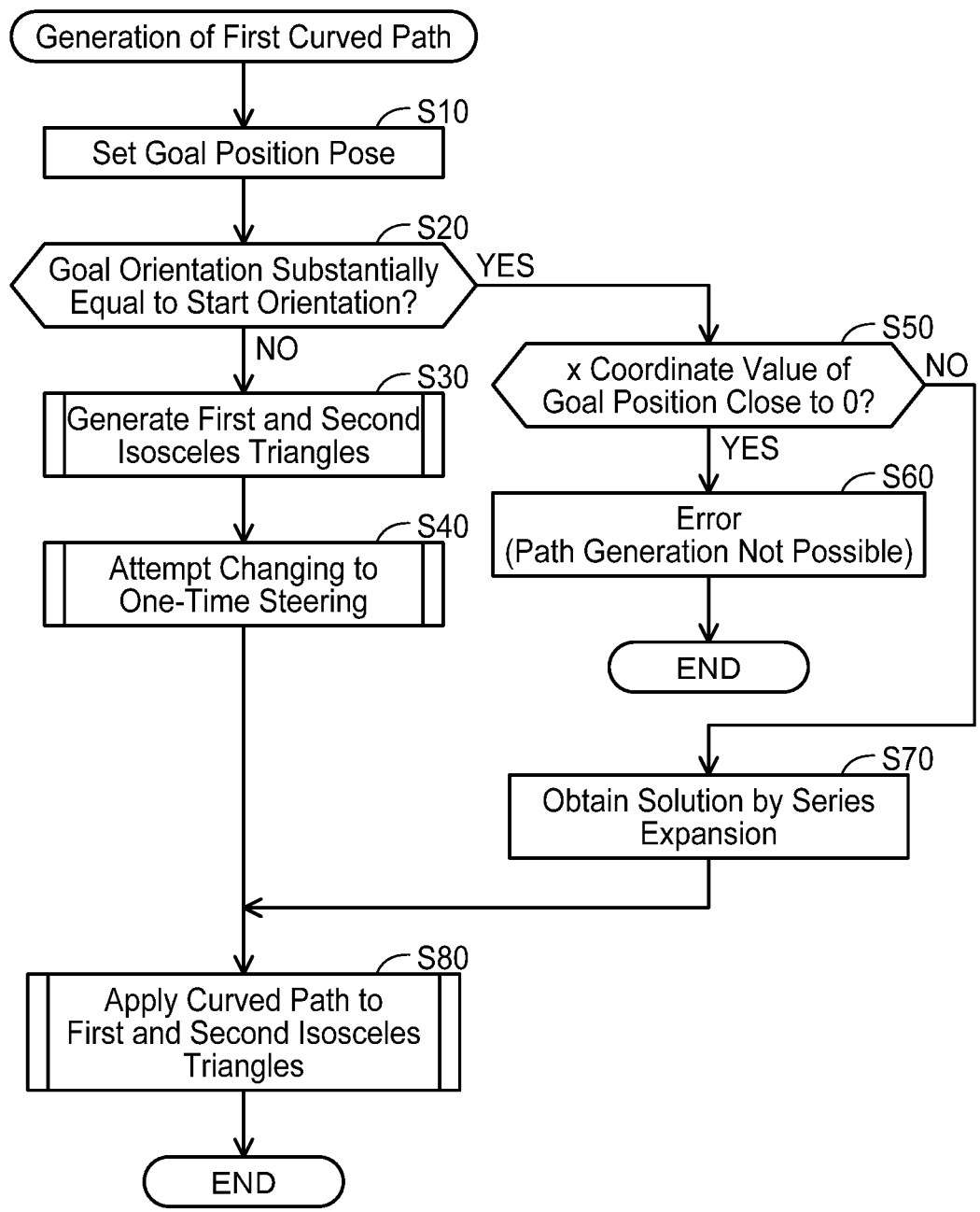
FIG. 3 is a flowchart showing a method of generating a curved path.

A method of generating a first curved path will be described with reference to FIG. 3. FIG. 3 is a flow of a case in which the curved path is generated when an instruction of the goal position is inputted.

In S10, the pose at the goal position P is set. S10 is a process executed by the start position/goal position setting module 35. The goal position P and the goal orientation A2 are set as shown in the example of FIG. 2.

In S20, the goal orientation A2 is determined as to whether it is substantially equal to the start orientation A1. That is, the goal orientation A2 is determined as to whether it is substantially parallel to the start orientation A1. Here, "substantially parallel" may for example be a case where a difference between the goal orientation A2 and the start orientation A1 is 3° or less. The steering planner module 41 proceeds to S30 in a case where the goal orientation A2 is not substantially equal to the start orientation A1 (S20: NO).

In S30, the steering angle and the steering angular velocity for the forklift 10 to travel from the start position O to the goal position P are planned. S30 is a process executed by the steering planner module 41. Specifically, the first isosceles triangle and the second isosceles triangle connecting the start position O and the goal position P are generated.

Figure 4:
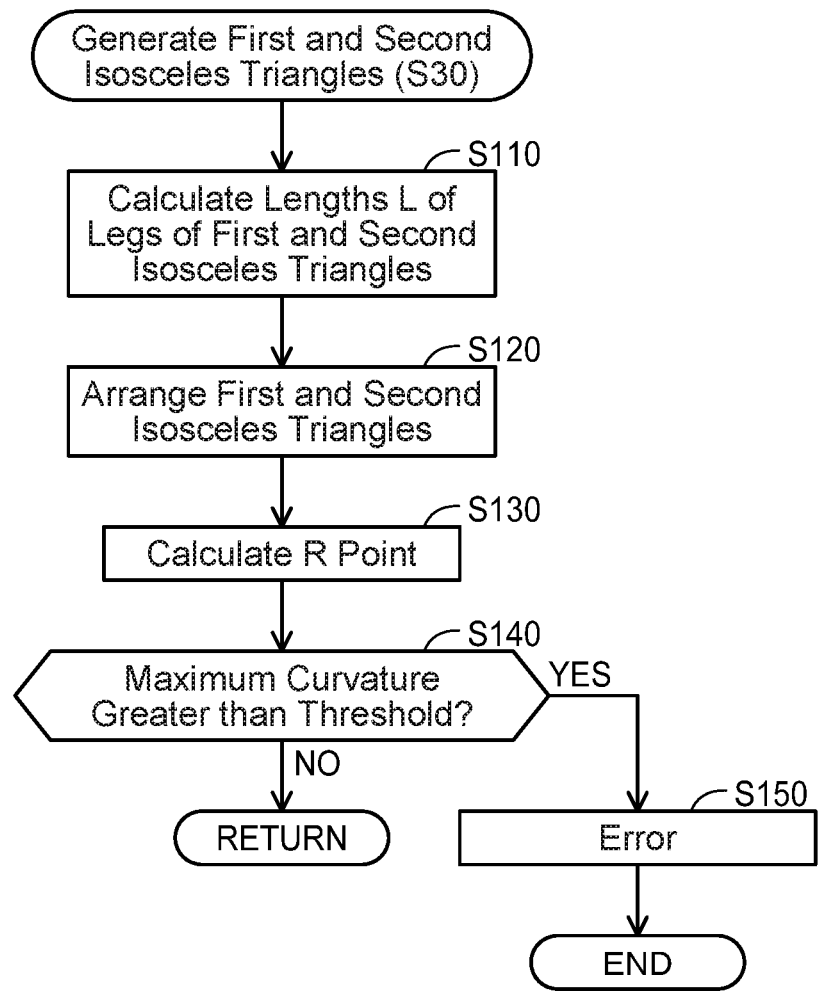
FIG. 4 is a flowchart explaining a process content of S30.
Figure 5:
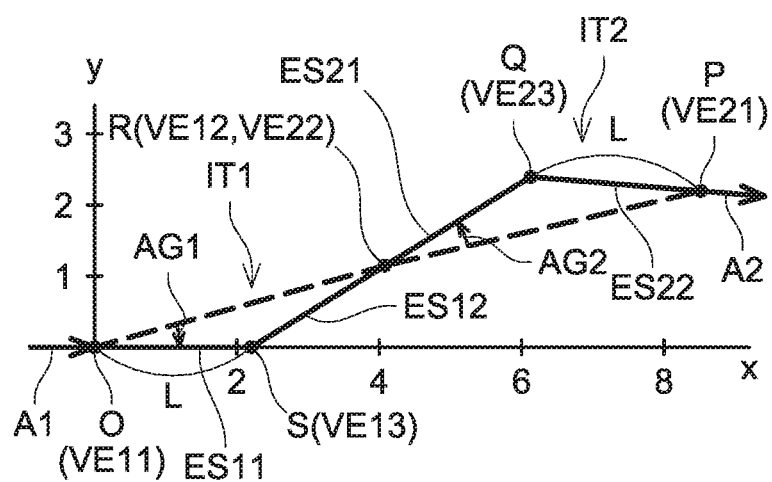
FIG. 5 is a diagram showing an example of forming first and second isosceles triangles.

A process content of S30 will be described using a flowchart of FIG. 4. In S110, lengths L of legs of the first and second isosceles triangles are calculated. The lengths L of the legs of the first and second isosceles triangles are equal. This takes into account easiness of solving equations and validity of solution. The lengths L of the legs are variables. Further, as shown in FIG. 5, a condition under which a leg ES12 and a leg ES21 align in a straight line at a connecting point of the first isosceles triangle IT1 and the second isosceles triangle IT2 is set. An equation established under this condition becomes a quadratic equation, thus this quadratic equation is solved. The lengths L of the legs are thereby obtained.

In S120, the first and second isosceles triangles are arranged. A specific example will be described using FIG. 5. A first vertex VE11 of the first isosceles triangle IT1 on a base side thereof is arranged at the start position O. A first vertex VE21 of the second isosceles triangle IT2 on a base side thereof is arranged at the goal position P. A third vertex VE13 (which is also termed a S point) interposed between the legs of the first isosceles triangle IT1 is set at a position on a x axis, being an extended line passing through the start position (and extending in a start orientation A1 direction, the position being at a distance of the length L of the legs from the start position O. A third vertex VE23 (which is also termed a Q point) interposed between the legs of the second isosceles triangle IT2 is set at a position on an extended line passing through the goal position P and extending in an opposite direction from the goal orientation A2, the position being at a distance of the length L of the legs from the goal position P.

In S130, a R point, which is a midpoint between the third vertex VE13 (S point) of the first isosceles triangle IT1 and the third vertex VE23 (Q point) of the second isosceles triangle IT2, is calculated. Then, the R point is set as a second vertex VE12 of the first isosceles triangle IT1 and a second vertex VE22 of the second isosceles triangle IT2. In other words, generation of the first isosceles triangle and the second isosceles triangle also means obtaining a position of the R point and inclinations of the legs ES12 and ES21 passing through the R point.

In S140, a determination is made on whether a maximum curvature of a curved path is greater than a preset threshold when the curved path is applied to the legs of the first isosceles triangle IT1 and the legs of the second isosceles triangle IT2. If a type of a curve to be applied is already determined, the maximum curvature can be uniquely obtained from a vertex angle and a size of an isosceles triangle. In a case where the maximum curvature is greater than the threshold (S140: YES), it is determined that the curve is too steep, proceeds to S150, and determines an error. On the other hand, in a case where the maximum curvature is less than or equal to the threshold (S140: NO), it is determined that the generation of the first isosceles triangle and the second isosceles triangle has been completed and proceeds to S40 of FIG. 3.

The threshold of the maximum curvature may be set to exclude curved paths applied to vertex angles smaller than a preset minimum angle (e.g., in a range of 60 to 90 degrees) as the error. By doing so, the generation of the curved path can be cancelled in a case where the vertex angle of the third vertex VE23 of the second isosceles triangle IT2 is smaller than 90 as in an example of FIG. 6.

Figure 7:
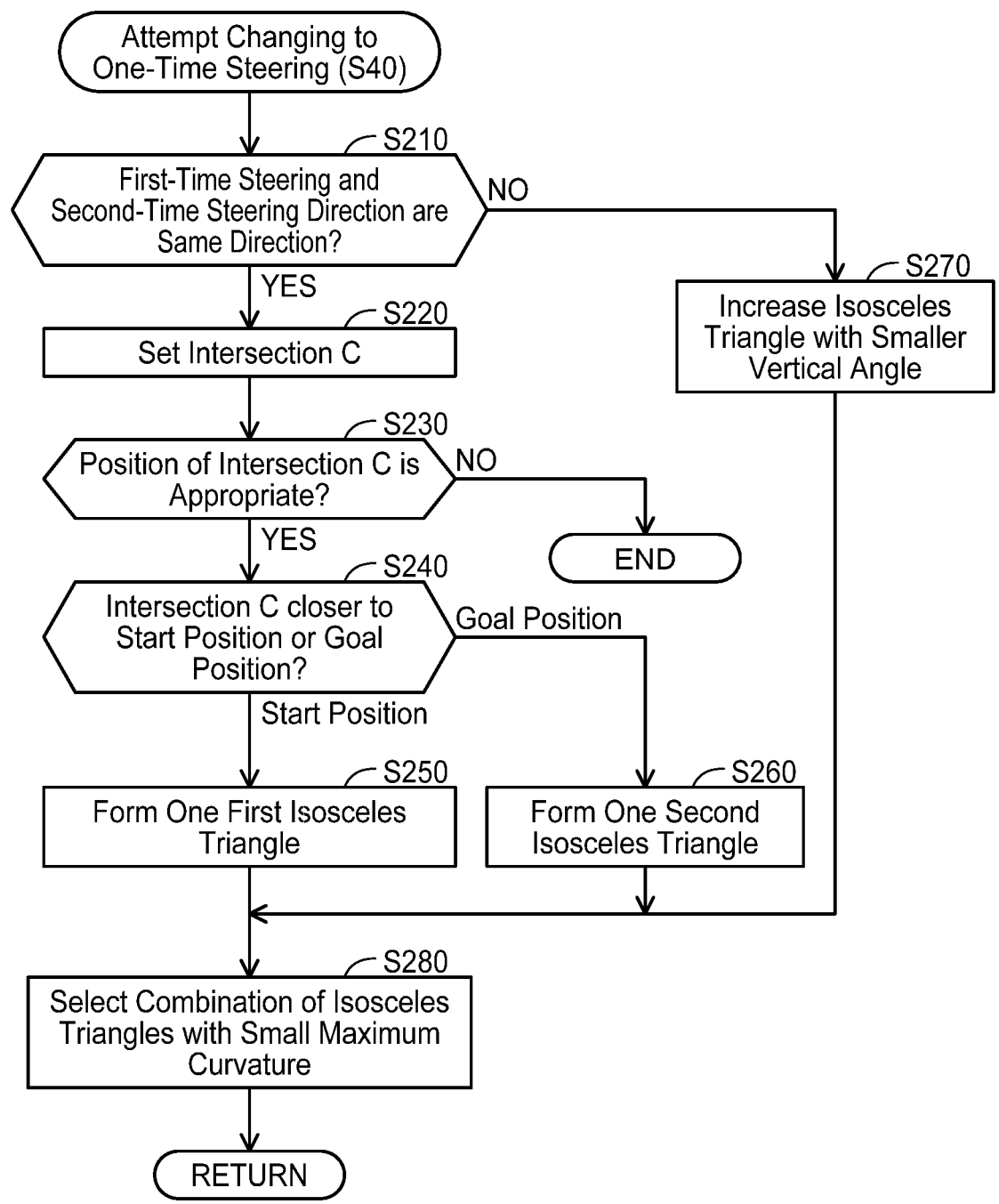
FIG. 7 is a flowchart explaining a process content of S40.

The description returns to the flow of FIG. 3. In S40, a change to one-time steering is attempted. A process content of S40 will be described using a flowchart of FIG. 7 and FIG. 5.

In S210, a determination is made on whether a first-time steering direction planned based on the first isosceles triangle and a second-time steering direction planned based on the second isosceles triangle are same directions. Specifically, positivity/negativity of a first angle AG1, which is a bottom angle which the leg ES11 (line OS) extending from the start position O forms with respect to the base (line OR) in the first isosceles triangle IT1, is determined. Further, positivity/negativity of a second angle AG2, which is a bottom angle which the leg ES21 (line RQ) extending from the second vertex VE22 (R point) forms with respect to the base (line RP) in the second isosceles triangle IT2, is determined.

In a case where the first angle AG1 and the second angle AG2 are both positive or both negative, the first-time steering direction and the second-time steering direction are determined as being the same directions (S210: YES). For example, the case shown in FIG. 8 has the first angle AG1 and the second angle AG2 both positive. In this case, the steering planner module 41 proceeds to S220 to change to the one-time steering.

Figure 8:
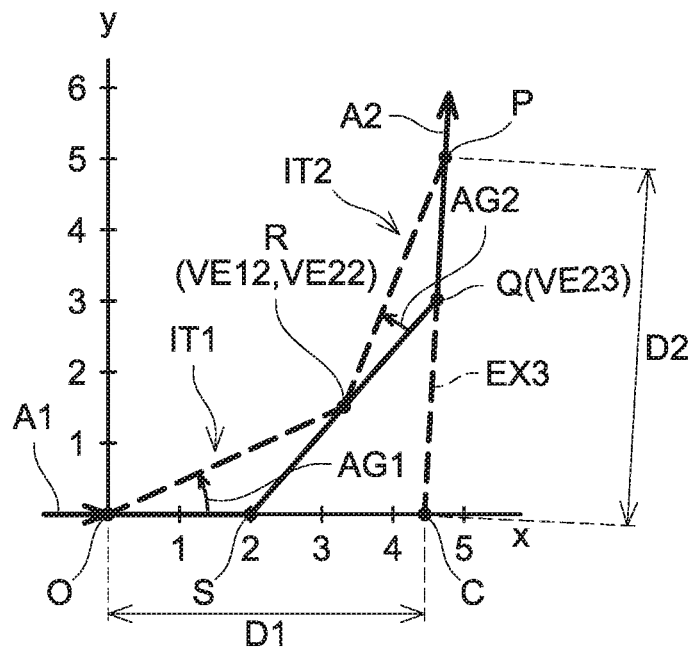
FIG. 8 is a diagram showing an example of forming the first and second isosceles triangles.

In S220, an extended line EX3 of a line QP connecting the goal position P and the third vertex VE23 (Q point) of the second isosceles triangle IT2 as shown in FIG. 8. Then, an intersection C of the extended line EX3 and the x axis is set.

In S230, a determination is made on whether a position of the intersection C is appropriate. Specifically, a determination is made on whether the intersection C is located on a x>0 side and on a rear side of a vector of the goal orientation A2 of the goal position P (that is, whether a scalar product of a vector of the line CP and the vector of the goal orientation A2 is negative). Since steering has been performed twice in the same direction, the position of the intersection C would be appropriate without exception under a normal state. In a case of a negative determination in S230 (NO: S230), an error determination is made and the flow is terminated. On the other hand, in a case of a positive determination in S230 (YES: S230), the steering planner module 41 proceeds to S240 to generate new isosceles triangles with the intersection C as a center.

In S240, it is determined that the intersection C is closer to which one of the start position O and the goal position P. Specifically, a first distance D1 between the start position O and the intersection C and a second distance D2 between the intersection C and the goal position P are compared.

In a case where the first distance D1 is smaller than the second distance D2, this is determined as a case in which the intersection C is closer to the start position O and proceeds to S250. In S250, a position on the extended line EX3 at the first distance D1 from the intersection C toward the goal position P is re-set as the second vertex VE12 (R point) of the first isosceles triangle IT1 and the second vertex VE22 (R point) of the second isosceles triangle IT2. Due to this, as shown in an example of FIG. 9, the new first isosceles triangle IT1 and second isosceles triangle IT2 are formed. Then, the steering planner module 41 proceeds to S280.

Figure 9:
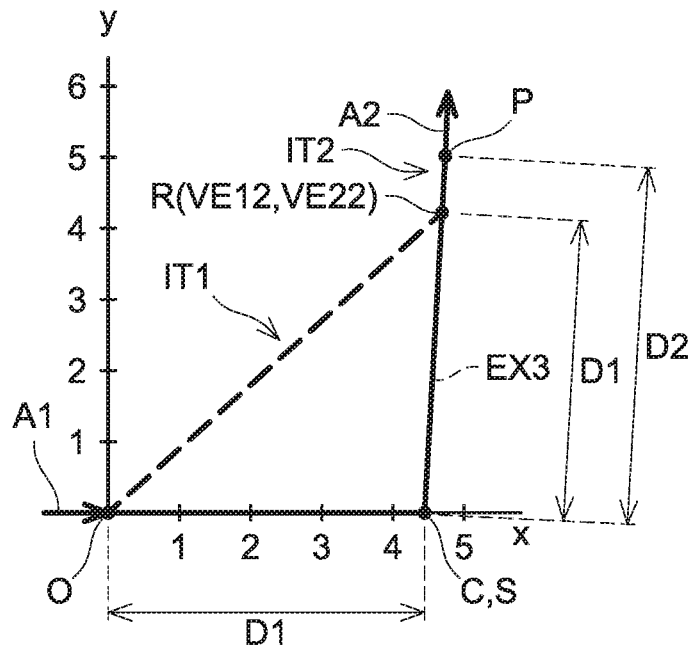
FIG. 9 is a diagram showing an example of forming the first and second isosceles triangles.

In FIG. 9, the second isosceles triangle IT2 is collapsed into a line. That is, the R point and the goal position P can be connected by a straight line. Due to this, a steering plan can be modified to be based on just the first isosceles triangle IT1. As such, the curved path can be completed by applying a curve in a method to be described later to the single isosceles triangle. Since a long curve length in which the curvature changes substantially constant can be ensured, an overall change in the curvature can be made small. Thus, a maximum value of a steering velocity can be suppressed to a small value in a case of moving at a same linear velocity.

Further, in a case where the second distance D2 is smaller than the first distance D1, this is determined as a case in which the intersection C is closer to the goal position P and proceeds to S260. In S260, the steering planner module 41 re-sets a position on the x axis at the second distance D2 from the intersection C toward the start position O as the second vertex VE12 (R point) of the first isosceles triangle IT1 and the second vertex VE22 (R point) of the second isosceles triangle IT2. Due to this, new first isosceles triangle IT and second isosceles triangle IT2 are formed. The first isosceles triangle IT1 is collapsed into a line. As such, the plan can be modified so that the steering plan is based on only the second isosceles triangle IT2.

On the other hand, in cases where one of the first angle AG1 and the second angle AG2 is positive and the other thereof is negative in S210, the first-time steering direction and the second-time steering direction are determined to be in different directions (S210: NO). In this case, two-time steering is not changed to one-time steering. As such, the steering planner module 41 proceeds to S270. In the example shown in FIG. 5, the negative determination is made in S210 since the first angle AG1 is negative and the second angle AG2 is positive.

Figure 6:
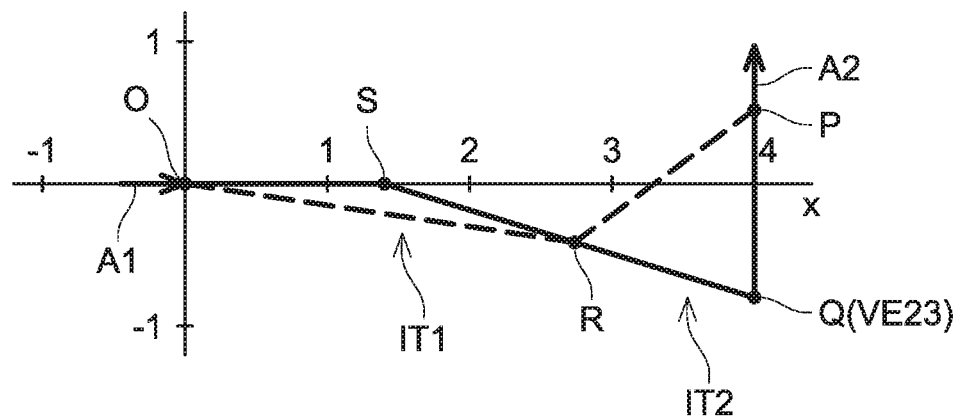
FIG. 6 is a diagram showing an example of forming the first and second isosceles triangles.
Figure 10:
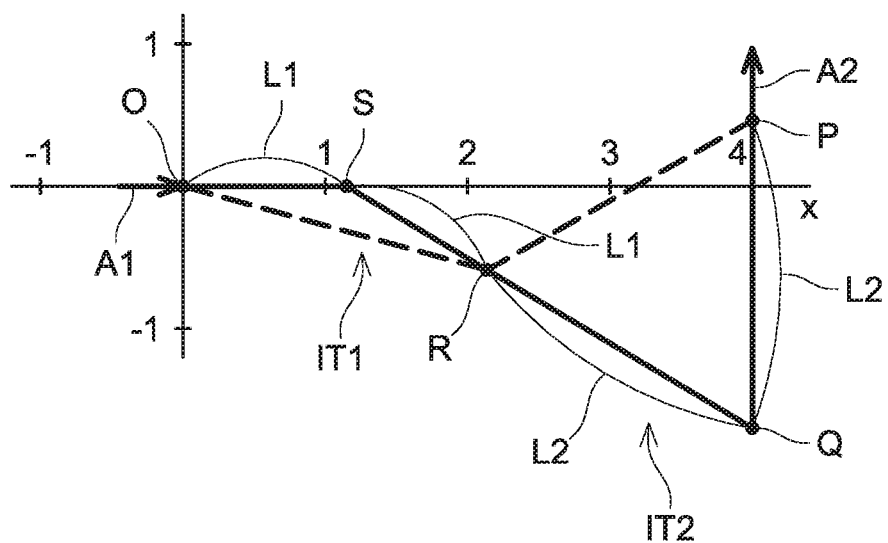
FIG. 10 is a diagram showing an example of forming the first and second isosceles triangles.

In S270, the lengths L of the legs of the isosceles triangles is changed by a constant factor in the first and second isosceles triangles in accordance with a ratio of the vertex angles of the first and second isosceles triangles. Specifically, between the first and second isosceles triangles, the length of the legs of the isosceles triangle with the smaller vertex angle (that is, with a steeper curve) is elongated and the length of the legs of the isosceles triangle with the larger vertex angle (that is, with a more moderate curve) is shortened. For example, in a case where the vertex angle of the second isosceles triangle IT2 is small as shown in FIG. 6, the length of each of the legs of the second isosceles triangle IT2 is elongated from L to L2 and the length of each of the legs of the first isosceles triangle IT1 is shortened from L to L1 as shown in FIG. 10. Due to this, the first isosceles triangle IT1 can be made small and the second isosceles triangle IT2 can be made large. Thus, since an area of the second isosceles triangle IT2 can be increased, the maximum curvature of the curved path planned for the second isosceles triangle IT2 can be made small (that is, the curve thereof can be made moderate).

In S280, the isosceles triangles having the smaller maximum curvature are selected from among the isosceles triangles generated in S30 and the isosceles triangles re-generated in S250, S260, and S270. Then, the steering planner module 41 proceeds to S80 of FIG. 3.

The explanation returns to the flow of FIG. 3. In a case where the goal orientation A2 is substantially equal to the start orientation A1 in S20 (S20: YES), the steering planner module 41 proceeds to S50. In S50, a determination is made on whether a x coordinate value of the goal position P is close to 0. A case of an affirmative determination (S50: YES) is a case in which the start orientation A1 and the goal orientation A2 are substantially equal and the start position O is located immediately adjacent to the goal position P. In such a case, backing up and turning before reaching the goal is expected more appropriate than using the curved path that takes a long detour. Due to this, the steering planner module 41 proceeds to S60 and determines an error (incapable of generating path).

On the other hand, in a case of a negative determination in S50 (S50: NO), the steering planner module 41 proceeds to S70. This case is a case in which the goal orientation A2 is substantially equal to the start orientation A1 and the start position O and the goal position P are separated by a certain distance. In such a case, a sum and a difference of the two solutions of the quadratic equation described in S110 would have infinite divergences, by which the calculation thereof becomes difficult. That is, a point that satisfies this condition is one solution instead of the two solutions of the quadratic equation. Thus, the steering planner module 41 proceeds to S70 and calculates the solution using the series expansion instead of the formula for the solutions of the quadratic equation. Since a known method can be used as the series expansion, the detailed description thereof will be herein omitted. Due to this, the continuous solution can be calculated stably even when the goal orientation A2 is substantially equal to the start orientation A1.

In S80, curved paths are applied to the first and second isosceles triangles. Specifically, a first curved path along the legs of the first isosceles triangle IT1 and a second curved path along the legs of the second isosceles triangle IT2 are generated.

Figure 11:
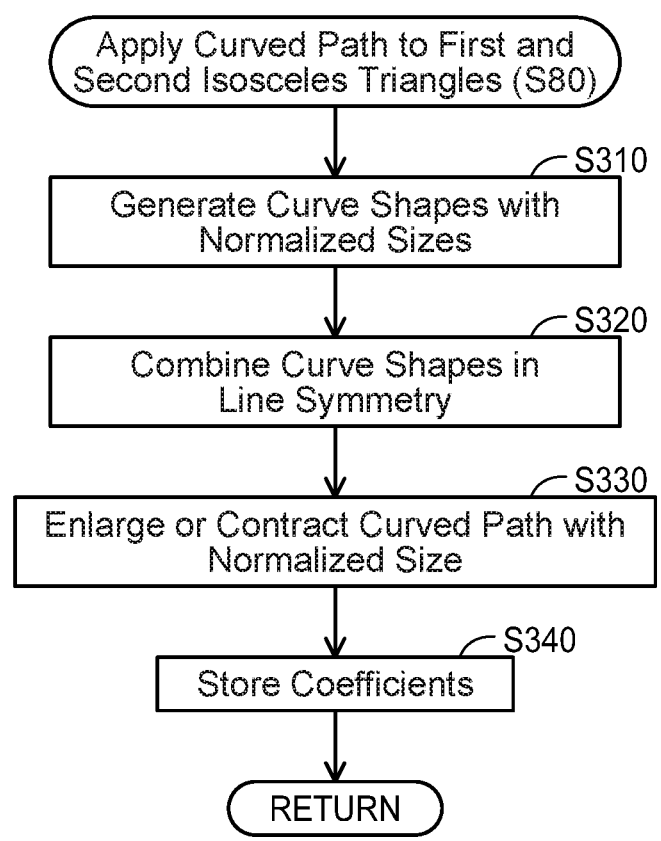
FIG. 11 is a flowchart explaining a process content of S80.

A process content of S80 will be described using a flowchart of FIG. 11. For generalization, the application of the curved path to the first isosceles triangle IT1 will only be described. This is because the application of the curved path to the second isosceles triangle IT2 can be carried out by exactly the same method as that for the first isosceles triangle IT1 by setting the R point as the origin by origin shifting and rotation.

Figure 12:
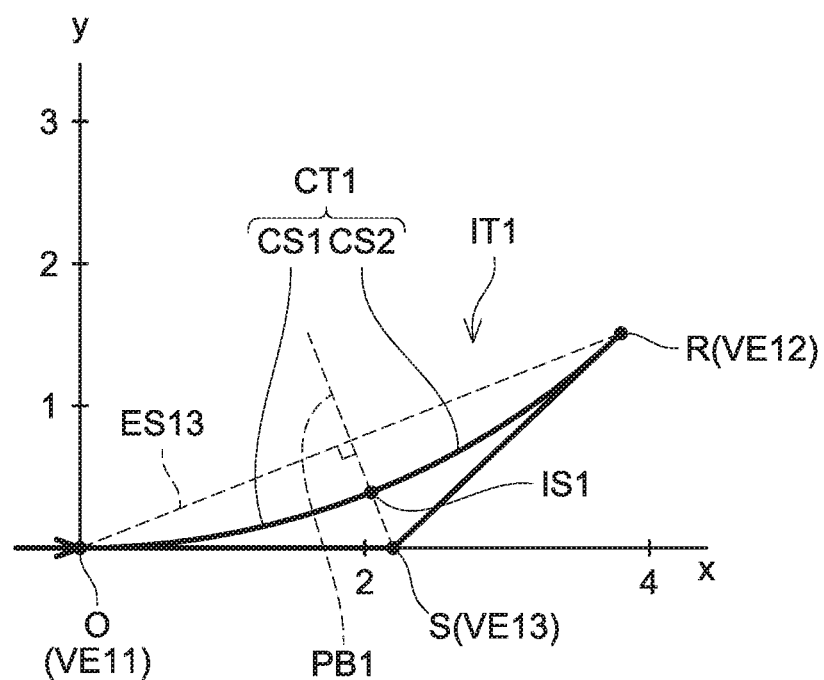
FIG. 12 is a diagram showing an example of application of the curved path.

Here, following rules stand true for the application of the curved path. (Rule 1) A curve is symmetrically applied to an isosceles triangle. (Rule 2) Curvature and inclination are both zero at the start position O. (Rule 3) under a condition that the inclination is continuous, as shown in FIG. 12, the inclination of the curved path at an intersection IS1 of a perpendicular bisector PB1 of a base ES13 of the isosceles triangle and the curved path is equal to an inclination of the base ES13 (line OR) of the isosceles triangle.

A parametric curve for generating a curve having a relationship of a curvature length and the curvature that is close to being linear is used for the application of the curved path. Any curve may be used as the parametric curve so long as its curvature inclination starts from 0 and increase therefrom. In the present embodiment, a case of using the parametric curve represented by following equations (1) and (2) will be described.

$$x = m \times (t - t^5/40) \quad \text{equation (1)}$$

$$y = m \times t^3/6 \quad \text{equation (2)}$$

Here, a magnifying factor m is a constant of a similarity transformation scaling, and t is a parameter. In the present embodiment, a case of m=1 (that is, a case of being normalized) will be described.

In the actual calculation, the calculation may be carried out using a parameter u as shown in a following equation (3).

$$t = u/m \quad \text{equation (3)}$$

When the equation (3) is substituted in the equations (1) and (2), following equations (4) and (5) are obtained.

$$x = u - u^5/(40m^4) \quad \text{equation (4)}$$

$$y = u^3/(6m^2) \quad \text{equation (5)}$$

The m is not indicatively calculated in the equations (4) and (5), but rather "$1/m^2$" may directly be calculated. This is because since only quadratic and biquadratic of m appear in the equations (4) and (5), there is no need to calculate "$1/m$".

The effect of carrying out the calculation using the equations (4) and (5) will be described. When the isosceles triangle collapses into a line, the inclination of the base becomes zero, the m diverges infinitely, and a range of t becomes 0 to 0, by which the calculation becomes impossible with the equations (1) and (2). However, with the equations (4) and (5), the m and t are not indicatively used. The calculation of "$1/m^2$" is used in the equations (4) and (5), and a range of "u" simply may be calculated from 0 to a maximum value of u. Due to this, the calculation can be carried out stably including the case in which the isosceles triangle collapses completely and becomes a line. In practice, the isosceles triangle collapses in many cases, thus a calculation method using the equations (4) and (5) is useful. Further, the parameter u substantially matches the curve length after having fitted to the isosceles triangle. As such, a velocity pattern can be generated using the parameter u as an affine curve length without calculating the true curve length. Since the numerical integration can be made unnecessary, velocity pattern design can easily be carried out.

Figure 13:
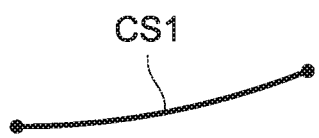
FIG. 13 is a diagram showing an example of forming a curved shape.

In S310, curve shapes with normalized size are generated. The specific description will be given. With the curve of the equations (1) and (2), when the slope is given, its corresponding parameter t is unique. As such, the parameter t can be calculated by solving the quadratic equations. That is, a value of the parameter t can be set by mathematically differentiating the equations (1) and (2). The setting of the value of the parameter t is conducted such that the inclination at the intersection IS1 of the perpendicular bisector PB1 (see FIG. 12) of the base ES13 of the first isosceles triangle IT1 and the curved path becomes equal to the inclination of the base ES13 of the first isosceles triangle IT1. By using the set value of the parameter t, the curve shape with the normalized size with the magnifying factor m of the similarity transformation of the equations (1) and (2) as "1" is obtained. In the example of FIG. 12 regarding the first isosceles triangle IT1, a curve shape CS1 as shown in FIG. 13 is obtained.

Figure 14:
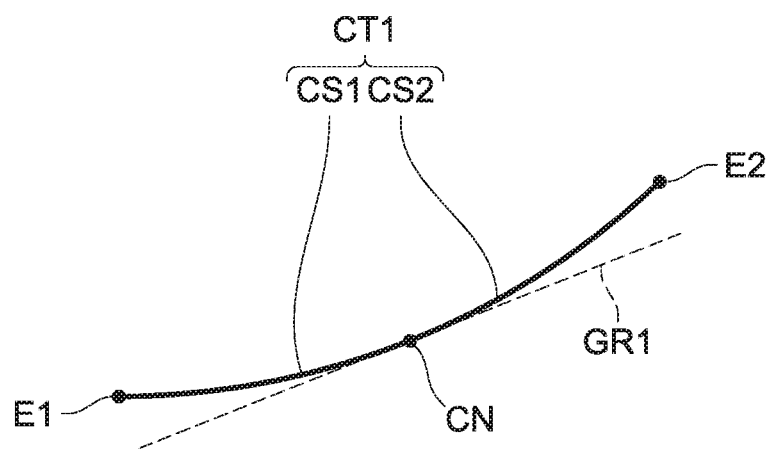
FIG. 14 is a diagram showing an example of forming the curved path.

In S320, the normalized curve shapes are combined in line symmetry with respect to the perpendicular bisector PB1 of the base ES13 of the first isosceles triangle IT1. Due to this, a curved path CT1 having the normalized size is generated. In the example of the first isosceles triangle IT1 in FIG. 12, the curved path CT1 in which the curve shapes CS1 and CS2 are combined is obtained, as shown in FIG. 14. An inclination GR1 (FIG. 14) at a connecting point CN of the curve shapes CS1 and CS2 is equal to the inclination of the base ES13 of the first isosceles triangle IT1 of FIG. 12 due to conditions of symmetry and differentiability thereof.

In S330, the curved path CT1 is enlarged or contracted so that respective ends of the curved path CT1 with the normalized size match the first vertex VE11 (start position O) and the second vertex VE12 (R point) of the first isosceles triangle IT1 on the base side. Specifically, one end E1 of the curved path CT1 of FIG. 14 is brought to match the start position O of FIG. 12. In doing so, a ratio between a position where the other end E2 of the curved path CT1 reach and the R point of FIG. 12 is calculated. Then, based on the ratio as calculated above, the curved path CT1 is enlarged or contracted. Due to this, as shown in FIG. 12, the application of the curved path CT1 to the first isosceles triangle IT1 is completed.

A curved path CT2 can be applied to the second isosceles triangle IT2 by similarly executing the processes of S310 to S330 as aforementioned. Due to this, a natural curved path can be generated for various combinations of the start position O and the goal position P.

In S340, coefficients for the case of applying the curves to the isosceles triangle are stored. Specifically, an enlarging/contracting ratio calculated in S330 and the value of the parameter t obtained in S310 are stored. A value that squared an inverse of the enlarging/contracting ratio may be used as the enlarging/contracting ratio. Then, the flow is terminated.

S310 and S320 are processes executed by the curved path generation module 42. S330 is a process executed by the curved path application module 43.

(Method of Calculating Positional Posture on Path)

Figure 15:
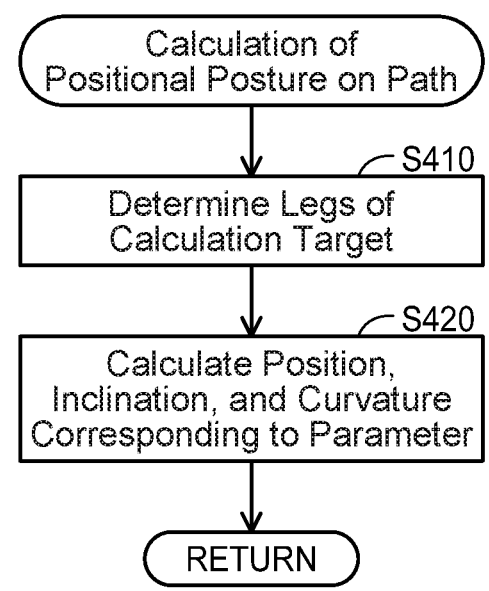
FIG. 15 is a flowchart showing a method of calculating a positional posture on the path.

A method of calculating a positional posture on the path while the forklift 10 is traveling will be described using a flowchart of FIG. 15. The flowchart of FIG. 15 is executed at a certain control cycle (such as every 10 milliseconds), for example. Processes of the flowchart of FIG. 15 are processes executed by the path following control module 48.

In S410, a determination is made on for which side among the four legs ES11, ES12, ES21, ES22 of the first and second isosceles triangles the curve should be calculated. Specific description will be given. The maximum values of the parameter t (which vary from 0 to the maximum value, respectively), corresponding to the four legs are already calculated. As such, by comparing sizes of the given values of the parameter t, the leg for which the curve should be calculated can easily be determined.

In S420, a position (x, y), an inclination, and a curvature corresponding to the parameter t are calculated. Specific description will be given. The position (x, y) is calculated by substituting the "magnifying factor m" of the parameter t, in a normalized equation of the curved path. The inclination at the position (x, y) can be calculated from a differentiated value of the equation representing the curved path. Further, the curvature κ at the position (x, y) can be calculated by second order differentiation.

Further, the steering angle φ of the forklift 10 corresponds on one-to-one basis with the curvature κ of the curved path as shown in a following equation (6).

$$\lambda(\cos\varphi, \sin\varphi, 0) = (v, 0, 0) + (0, 0, \kappa v) \times (bx, by, 0) \quad \text{equation (6)}$$

Here, v is a forward velocity at the center of the vehicle. bx is a position of steering wheels (wheelbase). by is the center point of the vehicle, and is half a tread. λ is a suitable constant. As such, the steering angle φ is calculated by a following equation (7).

$$\varphi = \tan^{-1}(bx\kappa/(1-by\kappa)) \quad \text{equation (7)}$$

(Effects)

In order to realize a forklift that travels unmanned without guides, a traveling line needs to be virtually set, that is, path generation is necessary. Representative methods of generating paths include a method using a clothoid curve and a method using a B-spline curve. Further, as a characteristic of the forklift, an upper limit of the steering velocity is low. This is because a handle cannot be turned at fast speed due to employment of power steering. Further, in the case of using the clothoid curve in the path generation, coordinates of clothoid points cannot be represented by elementary function, thus numerical integration is required. In this case, there may be cases in which path data generation within the control cycle is difficult. Further, in the case of using the B-spline curve in the path generation, there is a tendency of greater curvature changes near the starting point and ending points of a curved path. Due to this, there may be cases in which the curvature changes exceed the upper limit of the steering velocity of the forklift, resulting in difficulty for the forklift to follow the curved path.

The path generation device 40 of the present embodiment generates the path by applying the curved paths to the first isosceles triangle and the second isosceles triangle connecting the start position O and the goal position P. Due to this, as a first effect, path design using only algebraic calculation such as solving the quadratic equations and coordinate conversion is enabled. As compared to cases of using curves such as the clothoid curve that require the numerical integration, the curved path can be calculated within a short period of time. The path data can be generated within the control cycle. Further, as a second effect, a path with small curvature changes near starting and ending points can be generated. That is, a curved path having both zero curvature and inclination at both the start position O and the goal position P can be generated. This is for arranging the isosceles triangles such that the extended line (x axis) extending in the start orientation A1 direction overlaps the leg ES11 of the first isosceles triangle IT, and the leg ES22 of the second isosceles triangle IT2 overlaps the extended line extending in an opposite direction from the goal orientation A2 as shown in FIG. 5. Due to this, as compared to the path generated with the B-spline curve, a path that is suitable for the forklift having the low upper limit of the steering velocity can be generated.

The path generation device 40 of the present embodiment uses the parametric equations expressed as the equations (1) and (2). An effect of using the equations (1) and (2) will be described. In S310, the value of the parameter t is set based on the inclination of the curve. In this case, the parameter t is calculated by solving the quadratic equations. Further, since a quantic equation of the equation (1) and a cubic equation of the equation (2) become equations that include only $t^4$ and $t^2$ of the parameter t when they are differentiated, thus they can easily be reduced to the quadratic equations by setting "$t^2$" as a variable. That is, by using the equations (1) and (2), the algebraic calculation is practically enabled. Further, a cubic parametric equation can be calculated by algebraic calculation, however, a range to which it can be used is narrow as compared to the quantic equation of the equation (1), and it cannot be used for a case of turning at a right angle. As such, it can be understood that the quantic equation of the equation (1) is an equation characteristic in its broad applicable range and easy calculation.

While specific embodiments of the present invention have been described in detail above, such description is for illustrative purposes only and is not intended to limit the scope and claims of the invention. Techniques described in the claims of the invention include various modifications and changes made to the specific examples illustrated above.

(Variant)

In S60, a turn-taking path in which the traveling velocity is switched in forward and in reverse may be generated instead of determining an error. That is, such a turn-taking point may suitably be given, and a forward traveling path may be generated up to the turn-taking point using the present algorithm. Further, a reverse traveling path may be generated from the turn-taking point to the goal position P using the present algorithm.

In the present embodiment, the one-dimensional scan type area scan sensor is used as the area scan sensor 26, however, various sensors may be used. For example, the area scan sensor 26 may be a 2D LiDAR, a 3D LiDAR, a stereo camera, a monocular camera, or a distance image sensor. The self-position estimation module 38 may estimate its own position by means using satellite positioning.

The equations (1) and (2) are examples of the parametric curve. In the art disclosed in the present embodiment, various types of parametric curves may be used.

In S280, the method of selecting the isosceles triangle may vary. For example, the isosceles triangle with a smaller maximum value for the curvature change may be selected.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The start orientation A1 is an example of a goal position traveling direction. The goal orientation A2 is an example of a start position traveling direction. The steering planner module 41 is an example of a planner module The S point is an example of a third vertex interposed between the legs of the first isosceles triangle. The Q point is an example of a third vertex interposed between the legs of the second isosceles triangle.

The invention claimed is:

1. A path generation device configured to generate a path along which a mobile object is to travel, the device comprising:
   one or more microprocessors configured to:
      plan a steering angle and a steering angular velocity for the mobile object to travel from a start position to a goal position by generating a first isosceles triangle and a second isosceles triangle connecting the start position and the goal position based on the start position of the mobile object, a start position traveling direction being a traveling direction of the mobile object at the start position, the goal position of the mobile object, and a goal position traveling direction being a traveling direction of the mobile object at the goal position; and apply a first curved path along legs of the first isosceles triangle and apply a second curved path along legs of the second isosceles triangle, wherein the one or more microprocessors is configured to:

equalize lengths of the legs of the first isosceles triangle and lengths of the legs of the second isosceles triangle;

arrange a first vertex of the first isosceles triangle on a base side thereof at the start position;

arrange a first vertex of the second isosceles triangle on a base side thereof at the goal position; and connect a second vertex of the first isosceles triangle on the base side thereof with a second vertex of the second isosceles triangle on the base side thereof;

set a first value and a second value of a specific parameter by differentiating a parametric equation representing the curved path using a parameter;

generate a first curve shape by using the set first value of the specific parameter and a second curve shape by using the set second value of the specific parameter; and apply the first curved path to the legs of the first isosceles triangle by using the first curve shape and the second curved path to the legs of the second isosceles triangle by using the second curve shape, wherein the mobile object is controlled based on the first curved path and the second curved path.

2. The path generation device according to claim 1, wherein the one or more microprocessors is configured to:

calculate the lengths of the legs under a condition that the legs of the first and second isosceles triangles are in a straight line at a connecting point between the first isosceles triangle and the second isosceles triangle;

set a third vertex interposed between the legs of the first isosceles triangle at a position on a first extended line passing through the start position and extending in the start position traveling direction, the position being at a distance equal to the length of the legs from the start position;

set a third vertex interposed between the legs of the second isosceles triangle at a position on a second extended line passing through the goal position and extending in the goal position traveling direction, the position being at a distance equal to the length of the legs from the goal position; and set a midpoint between the third vertex of the first isosceles triangle and the third vertex of the second isosceles triangle as the second vertex of the first isosceles triangle and the second vertex of the second isosceles triangle.

3. The path generation device according to claim 2, wherein the one or more microprocessors is configured to:

determine positivity/negativity of a first angle which is an angle formed by the leg of the first isosceles triangle extending from the start position with respect to a base of the first isosceles triangle;

determine positivity/negativity of a second angle which is an angle formed by the leg of the second isosceles triangle extending from the second vertex with respect to a base of the second isosceles triangle;

in a case where the first and second angles are both positive or both negative, set an intersection of the first extended line and a third extended line which connects the goal position and the third vertex of the second isosceles triangle;

in a case where a first distance between the intersection and the start position is smaller than a second distance between the intersection and the goal position, re-set a position on the third extended line, the position being at the first distance from the intersection toward the goal position, as the second vertices of the first and second isosceles triangles; and in a case where the first distance is greater than the second distance, re-set a position on the first extended line, the position being at the second distance from the intersection toward the start position, as the second vertices of the first and second isosceles triangles.

4. The path generation device according to claim 1, wherein the one or more processors is configured to:

set the first value of the specific parameter by differentiating the parametric equation such that an inclination of the curved path at an intersection between a perpendicular bisector of a base of the first isosceles triangle and the curved path becomes equal to an inclination of the base of the first isosceles triangle;

set the second value of the specific parameter by differentiating the parametric equation such that an inclination of the curved path at an intersection between a perpendicular bisector of a base of the second isosceles triangle and the curved path becomes equal to an inclination of the base of the second isosceles triangle;

generate the first curve shape with a normalized size by combining paths obtained by the set first value of the specific parameter with the perpendicular bisector of the base of the first isosceles triangle in line symmetry;

generate the second curve shape with a normalized size by combining paths obtained by the set second value of the specific parameter with the perpendicular bisector of the base of the second isosceles triangle in line symmetry;

apply the first curved path to the legs of the first isosceles triangle by enlarging or contracting the first curve shape with the normalized size such that respective ends of the first curve shape with the normalized size match the first and second vertices of the first isosceles triangle on the base side thereof; and apply the second curved path to the legs of the second isosceles triangle by enlarging or contracting the second curve shape with the normalized size such that respective ends of the second curve shape with the normalized size match the first and second vertices of the second isosceles triangle on the base side thereof.

5. The path generation device according to claim 4, wherein the parametric equation is a quintic equation of the parameter, and an equation that differentiated the parametric equation by reducing the power by one includes the parameter only in a quadratic or biquadratic form.

6. A method of generating a path along which a mobile object is to travel, the method comprising:

planning a steering angle and a steering angular velocity for the mobile object to travel from a start position to a goal position by generating a first isosceles triangle and a second isosceles triangle connecting the start position and the goal position based on the start position of the mobile object, a start position traveling direction being a traveling direction of the mobile object at the start position, the goal position of the mobile object, and a goal position traveling direction being a traveling direction of the mobile object at the goal position; and applying a first curved path along legs of the first isosceles triangle and apply a second curved path along legs of the second isosceles triangle, wherein the planning of the steering angle and the steering angular velocity includes:

equalizing lengths of the legs of the first isosceles triangle and lengths of the legs of the second isosceles triangle;

arranging a first vertex of the first isosceles triangle on a base side thereof at the start position;

arranging a first vertex of the second isosceles triangle on a base side thereof at the goal position; and connecting a second vertex of the first isosceles triangle on the base side thereof with a second vertex of the second isosceles triangle on the base side thereof, and the applying of the first curved path and the second curved path includes:

setting a first value and a second value of a specific parameter by differentiating a parametric equation representing the curved path using a parameter;

generating a first curve shape by using the set first value of the specific parameter and a second curve shape by using the set second value of the specific parameter; and applying the first curved path to the legs of the first isosceles triangle by using the first curve shape and the second curved path to the legs of the second isosceles triangle by using the second curve shape, wherein the mobile object is controlled based on the first curved path and the second curved path.

7. The method according to claim 6, wherein the planning of the steering angle and the steering angular velocity includes:

calculating the lengths of the legs under a condition that the legs of the first and second isosceles triangles are in a straight line at a connecting point between the first isosceles triangle and the second isosceles triangle;

setting a third vertex interposed between the legs of the first isosceles triangle at a position on a first extended line passing through the start position and extending in the start position traveling direction, the position being at a distance equal to the length of the legs from the start position;

setting a third vertex interposed between the legs of the second isosceles triangle at a position on a second extended line passing through the goal position and extending in the goal position traveling direction, the position being at a distance equal to the length of the legs from the goal position; and setting a midpoint between the third vertex of the first isosceles triangle and the third vertex of the second isosceles triangle as the second vertex of the first isosceles triangle and the second vertex of the second isosceles triangle.

8. The method according to claim 7, wherein the planning of the steering angle and the steering angular velocity includes:

determining positivity/negativity of a first angle which is an angle formed by the leg of the first isosceles triangle extending from the start position with respect to a base of the first isosceles triangle;

determining positivity/negativity of a second angle which is an angle formed by the leg of the second isosceles triangle extending from the second vertex with respect to a base of the second isosceles triangle;

in a case where the first and second angles are both positive or both negative, setting an intersection of the first extended line and a third extended line which connects the goal position and the third vertex of the second isosceles triangle;

in a case where a first distance between the intersection and the start position is smaller than a second distance between the intersection and the goal position, re-setting a position on the third extended line, the position being at the first distance from the intersection toward the goal position, as the second vertices of the first and second isosceles triangles; and in a case where the first distance is greater than the second distance, re-setting a position on the first extended line, the position being at the second distance from the intersection toward the start position, as the second vertices of the first and second isosceles triangles.

9. The method according to claim 6, wherein the applying of the first curved path includes:

setting the first value of the specific parameter by differentiating the parametric equation such that an inclination of the curved path at an intersection between a perpendicular bisector of a base of the first isosceles triangle and the curved path becomes equal to an inclination of the base of the first isosceles triangle;

setting the second value of the specific parameter by differentiating the parametric equation such that an inclination of the curved path at an intersection between a perpendicular bisector of a base of the second isosceles triangle and the curved path becomes equal to an inclination of the base of the second isosceles triangle;

generating the first curve shape with a normalized size by combining paths obtained by the set first value of the specific parameter with the perpendicular bisector of the base of the first isosceles triangle in line symmetry;

generating the second curve shape with a normalized size by combining paths obtained by the set second value of the specific parameter with the perpendicular bisector of the base of the second isosceles triangle in line symmetry;

applying the first curved path to the legs of the first isosceles triangle by enlarging or contracting the first curve shape with the normalized size such that respective ends of the first curve shape with the normalized size match the first and second vertices of the first isosceles triangle on the base side thereof; and applying the second curved path to the legs of the second isosceles triangle by enlarging or contracting the second curve shape with the normalized size such that respective ends of the second curve shape with the normalized size match the first and second vertices of the second isosceles triangle on the base side thereof.

10. The method according to claim 9, wherein the parametric equation is a quintic equation of the parameter, and an equation that differentiated the parametric equation by reducing the power by one includes the parameter only in a quadratic or biquadratic form.

11. A non-transitory computer-readable recording medium which stores computer-readable instructions for an arithmetic unit comprising a processor,
the computer-readable instructions, when executed by the processor, causing the arithmetic unit to perform:
planning a steering angle and a steering angular velocity for a mobile object to travel from a start position to a goal position by generating a first isosceles triangle and a second isosceles triangle connecting the start position and the goal position based on the start position of the mobile object, a start position traveling direction being a traveling direction of the mobile object at the start position, the goal position of the mobile object, and a goal position traveling direction being a traveling direction of the mobile object at the goal position; and
applying a first curved path along legs of the first isosceles triangle and apply a second curved path along legs of the second isosceles triangle,
wherein
the planning of the steering angle and the steering angular velocity includes:
equalizing lengths of the legs of the first isosceles triangle and lengths of the legs of the second isosceles triangle;
arranging a first vertex of the first isosceles triangle on a base side thereof at the start position;
arranging a first vertex of the second isosceles triangle on a base side thereof at the goal position; and
connecting a second vertex of the first isosceles triangle on the base side thereof with a second vertex of the second isosceles triangle on the base side thereof, and
the applying of the first curved path and the second curved path includes:
setting a first value and a second value of a specific parameter by differentiating a parametric equation representing the curved path using a parameter;
generating a first curve shape by using the set first value of the specific parameter and a second curve shape by using the set second value of the specific parameter; and
applying the first curved path to the legs of the first isosceles triangle by using the first curve shape and the second curved path to the legs of the second isosceles triangle by using the second curve shape,
wherein the mobile object is controlled based on the first curved path and the second curved path.

12. The non-transitory computer-readable recording medium according to claim 11, wherein
the planning of the steering angle and the steering angular velocity includes:
calculating the lengths of the legs under a condition that the legs of the first and second isosceles triangles are in a straight line at a connecting point between the first isosceles triangle and the second isosceles triangle;
setting a third vertex interposed between the legs of the first isosceles triangle at a position on a first extended line passing through the start position and extending in the start position traveling direction, the position being at a distance equal to the length of the legs from the start position;
setting a third vertex interposed between the legs of the second isosceles triangle at a position on a second extended line passing through the goal position and extending in the goal position traveling direction, the position being at a distance equal to the length of the legs from the goal position; and
setting a midpoint between the third vertex of the first isosceles triangle and the third vertex of the second isosceles triangle as the second vertex of the first isosceles triangle and the second vertex of the second isosceles triangle.

13. The non-transitory computer-readable recording medium according to claim 12, wherein
the planning of the steering angle and the steering angular velocity includes:
determining positivity/negativity of a first angle which is an angle formed by the leg of the first isosceles triangle extending from the start position with respect to a base of the first isosceles triangle;
determining positivity/negativity of a second angle which is an angle formed by the leg of the second isosceles triangle extending from the second vertex with respect to a base of the second isosceles triangle;
in a case where the first and second angles are both positive or both negative, setting an intersection of the first extended line and a third extended line which connects the goal position and the third vertex of the second isosceles triangle;
in a case where a first distance between the intersection and the start position is smaller than a second distance between the intersection and the goal position, re-setting a position on the third extended line, the position being at the first distance from the intersection toward the goal position, as the second vertices of the first and second isosceles triangles; and
in a case where the first distance is greater than the second distance, re-setting a position on the first extended line, the position being at the second distance from the intersection toward the start position, as the second vertices of the first and second isosceles triangles.

14. The non-transitory computer-readable recording medium according to claim 11, wherein
the applying of the first curved path includes:
setting the first value of the specific parameter by differentiating the parametric equation such that an inclination of the curved path at an intersection between a perpendicular bisector of a base of the first isosceles triangle and the curved path becomes equal to an inclination of the base of the first isosceles triangle;
setting the second value of the specific parameter by differentiating the parametric equation such that an inclination of the curved path at an intersection between a perpendicular bisector of a base of the second isosceles triangle and the curved path becomes equal to an inclination of the base of the second isosceles triangle;
generating the first curve shape with a normalized size by combining paths obtained by the set first value of the specific parameter with the perpendicular bisector of the base of the first isosceles triangle in line symmetry;
generating the second curve shape with a normalized size by combining paths obtained by the set second value of the specific parameter with the perpendicular bisector of the base of the second isosceles triangle in line symmetry;
applying the first curved path to the legs of the first isosceles triangle by enlarging or contracting the first curve shape with the normalized size such that respective ends of the first curve shape with the normalized size match the first and second vertices of the first isosceles triangle on the base side thereof; and applying the second curved path to the legs of the second isosceles triangle by enlarging or contracting the second curve shape with the normalized size such that respective ends of the second curve shape with the normalized size match the first and second vertices of the second isosceles triangle on the base side thereof.

15. The non-transitory computer-readable recording medium according to claim 14, wherein the parametric equation is a quintic equation of the parameter, and an equation that differentiated the parametric equation by reducing the power by one includes the parameter only in a quadratic or biquadratic form.

* * * * *